May 12, 1964 H. H. WYMANN 3,132,558
OPTICAL SYMBOL INDICATORS
Filed Feb. 13, 1961 2 Sheets-Sheet 1

Inventor
Hans Heinrich Wymann
By Stevens Davis Miller & Mosher
Attorneys

May 12, 1964

H. H. WYMANN 3,132,558

OPTICAL SYMBOL INDICATORS

Filed Feb. 13, 1961

Inventor
Hans Heinrich Wymann
By Stevens Davis Miller & Mosher
Attorneys

United States Patent Office 3,132,558
Patented May 12, 1964

3,132,558
OPTICAL SYMBOL INDICATORS
Hans Heinrich Wymann, Ruttihof, Biberist, Switzerland, assignor to Autophon Aktiengesellschaft, Solothurn, Switzerland
Filed Feb. 13, 1961, Ser. No. 88,954
Claims priority, application Switzerland Feb. 24, 1960
8 Claims. (Cl. 88—24)

This invention relates to optical symbol indicators, and more particularly to optical indicating devices of the type employing two superimposed rotary symbol-bearing discs, and wherein the discs may be rotated to move a designated symbol on one of the discs into a position of registry with a projection opening in the other disc, whereby to make it possible to project the designated symbol onto a viewing screen.

A main object of the invention is to provide a novel and improved optical symbol indicator of the above type, the indicator being relatively simple in construction, being reliable in operation, and requiring a minimum number of connecting wires.

A still further object of the invention is to provide an improved optical symbol indicator of the above described type which is arranged so that the same control device may be employed alternately with several such symbol indicators.

Further objects and advantages of the invention will become apparent from the following description and claims, and from the accompanying drawings, wherein:

A prime purpose of the present invention is to provide an improved optical symbol indicator of the type which comprises two superimposed rotatable symbol-bearing discs, and wherein the symbols are moved one after the other past a given position, namely, a particular superimposed arrangement of the discs, wherein the symbols may be made visible. In this particular superimposed position, the selected symbol (on one of the discs) is placed in registry with a projection aperture in the other disc, so that the selected symbol is visible through the aperture. The two discs are preferably driven by step-by-step motors advanced by pulses of alternating polarity, the discs being provided with synchronizing means, such as that described for example in Swiss Patent 295,859. By the use of such a synchronizing device, it is possible to operate the indicator device from a control device, which may be employed alternately with several symbol indicators, and to move a disc in an indicator which is initially in a random position to any desired indicating position.

In accordance with this invention, the synchronizing device includes a stop means cooperating with each disc which yieldably retains the disc in a synchronizing position as long as pulses of a normal voltage are furnished to the associated step-by-step motor. The stop means is so arranged that it may be overcome when a pulse of increased voltage, hereinafter referred to as a synchronization pulse, is furnished to the corresponding step-by-step motor.

Each of the two step-by-step motors of a given symbol indicator requires two leads. One of them can be connected to a line which is common to several step-by-step motors, so that accordingly at least two individual wires are ordinarily required for each symbol indicator. There are instances, for example, when it is necessary to connect such wires by means of plug connectors, in which a reduction of the number of wires required would be desirable. The device of the present invention makes possible a reduction to a single individual wire for each symbol indicator.

The symbol indicator of the present invention is characterized by the fact that the two step-by-step motors are connected to a common line and that the mutual positions of the discs and of the armatures of the step-by-step motors are so selected, that one step-by-step motor, the corresponding disc being in the synchronization position, assumes such a position that a synchronization pulse to be applied to the line in order to advance its armature, differs in polarity from a synchronization pulse to be applied to the line in order to advance the armature of the other step-by-step motor, the corresponding disc being in the synchronization position.

Figure 1:
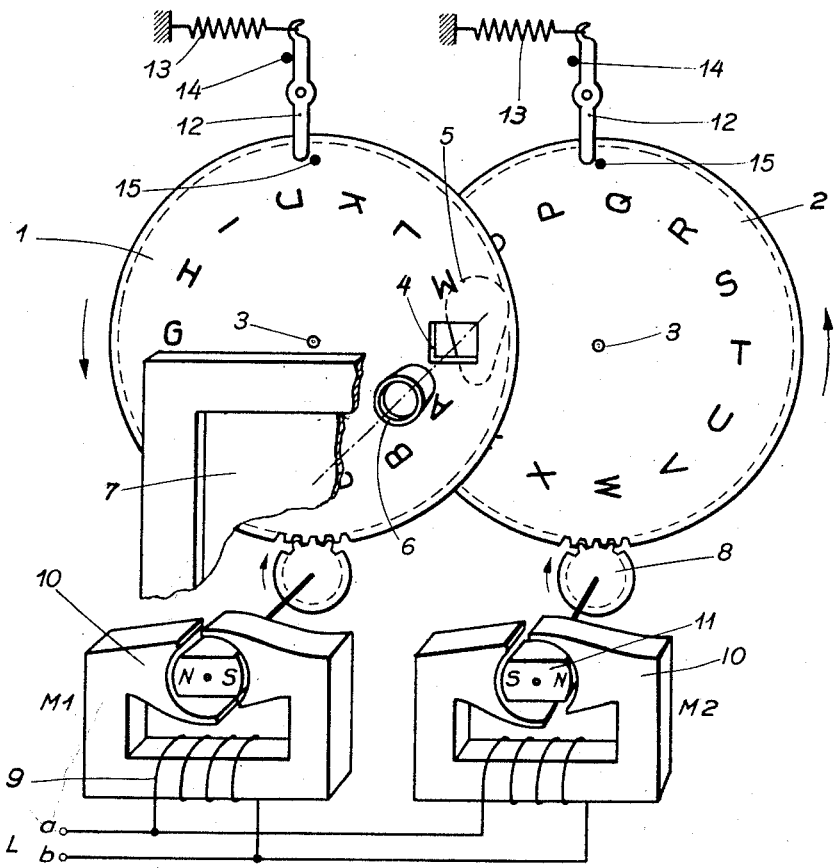
FIGURE 1 is a schematic view, partly in perspective, of an optical symbol indicator constructed in accordance with the present invention, and which is arranged to permit the projection of any selected letter of the alphabet onto a viewing screen.

The symbol indicator shown in FIGURE 1 comprises two superimposed opaque discs 1 and 2 which bear concentrically arranged, spaced series of transparent letters, and which are suitably mounted to rotate about centers 3. The disc 1 bears the inscribed letters A–M, while the disc 2 similarly bears the inscribed letters N–Z. The discs overlap in a given region, which can readily be seen from FIGURE 1. Each of the letter-bearing opaque discs has an aperture 4 located on the same circle as the letters on the disc and located in the same manner as the letters. As will be seen, the discs are arranged so that the apertures 4 are registrable with each other, and so that the letters on the one disc may be selectively registered with the aperture 4 of the other disc.

There is furthermore provided a projector, which comprises a projection lamp 5, indicated in dotted view behind the discs, a condenser (not shown), and the projection lens assembly 6. The optical axis of the projection system coincides with the axis of registry of the apertures 4, 4 of the discs, so that a transparency on this axis of registry can be projected onto a ground glass screen 7. Therefore, if one of the discs is in the position illustrated in FIGURE 1, but the other disc is in a different position, a letter on said other disc registering with the aperture of said one disc will be in the optical field of the projection system, and said letter will be projected onto the ground glass screen 7.

The letter-bearing discs are driven by gears 8 which mesh with gear teeth provided on the peripheries of the discs, said gears 8 being driven by the respective step-by-step motors M1 and M2. Each step-by-step motor consists of a coil 9 wound on a specially shaped yoke 10 and a permanent-magnet armature 11, the magnetic poles of which are marked N and S. This armature has two different stable positions half a revolution apart from each other, and by the application of D.C. pulses of alternating polarity to the associated coil, the armature is urged to rotate half a revolution in a clockwise direction with each pulse. Accordingly, the corresponding disc will be driven by the armature, with each pulse producing such half revolution of the armature, through an angle corresponding to the distance between two letters. For example, in order to rotate the armature of the motor M1 half a revolution and thus move the corresponding letter-bearing disc one position forward, a pulse is required of a voltage which is positive at the wire $a$ and negative at the wire $b$. In such a case, a north pole is produced at the left pole in the yoke, and a south pole is produced at the right pole in the yoke, which causes a half revolution of the armature, since similar poles repel each other. If, however, in the position shown, a pulse of opposite polarity is applied to the motor M1, a south pole is developed at the left pole of the yoke and a north pole at the right pole of the yoke, the armature remaining stationary. In the case of the motor M2 the conditions are precisely the opposite. The two positions of the armature differ thus in the polarity of the pulse which must be applied to the corresponding motor coil in order to reverse the position of the armature.

With each letter-bearing disc there is associated a synchronization device which comprises a lever 12, a spring 13, and a stop 14. Each disc carries a stop pin 15 into the path of which the associated lever 12 extends. The position in which the two lever-engaging discs are shown in FIGURE 1 is hereinafter called the synchronization position. In this position, the pin 15 engages the associated lever 12 whereby further movement of the corresponding disc is restrained. The voltage of the pulses applied to the step-by-step motors, for the normal advancement of the discs, the force exerted by the springs 13, and the transmission ratio of the levers 12 are so selected that the normal pulses do not suffice to advance the discs from the synchronization position, and thus the passing of a disc beyond the synchronization position is possible only by the application of a synchronization pulse of increased voltage to the corresponding step-by-step motor. In this case of the associated lever 12 is rotated in a clockwise direction by the adjacent pin 15, permitting the pin to pass by, and the lever then returns under the action of the spring 13 to its rest position wherein it engages the associated stop element 14. The transmission ratio between the motors and the letter-bearing discs is even-numbered, so that the synchronization position of a disc always corresponds to the same position of the corresponding armature.

The mutual positions of the motor armatures and of the stop pins 15 of the letter-bearing discs are selected, as can be seen from FIGURE 1, on the basis of the designations of polarity N and S in such a manner that in order to move the symbol-bearing disc to the left out of the synchronization position, there is required a synchronization pulse which is positive at the wire $a$ and negative at the wire $b$, while in order to move the letter-bearing disc to the right out of the synchronization position, a synchronization pulse of reverse polarity is required. Expressed differently, a synchronization pulse required for advancing the letter-bearing disc to the left from the synchronization position differs in polarity from that required to advance the letter-bearing disc to the right.

By means of the synchronization device, it is possible to set different symbol indicators, which are to be brought from a random position into a given position, by a single control device which is available alternatively to the different indicators. Furthermore, the same synchronization device in combination with the described arrangement of the step-by-step motors makes it possible to actuate the two discs of an indicating unit alternately over a single line. The first-mentioned result is obtained by applying to the step-by-step motor of a symbol-bearing disc which is in random position first of all pulses of alternating polarity, the number of which corresponds to an entire revolution of the disc. The disc, as long as it is not in the synchronization position, is rotated by these reset pulses and thus eventually moves into the synchronization position, where it cannot be moved further despite the continuation of transmission of the pulses. It remains for the time being, therefore, in this position, which defines a predetermined starting position. As a result of a synchronization pulse of increased voltage applied to the motor, the corresponding symbol-bearing disc moves out of the synchronization position and is brought into the desired symbol-indicating position by the pulses following the synchronization pulse, which pulses are counted off by the control device.

The selective advancement of only one or the other of the symbol-bearing discs is achieved in a manner such that while both discs are in the synchronization position, the polarity of the synchronizing pulse is selected by the control device in accordance with the disc which is to be rotated.

Figure 3:
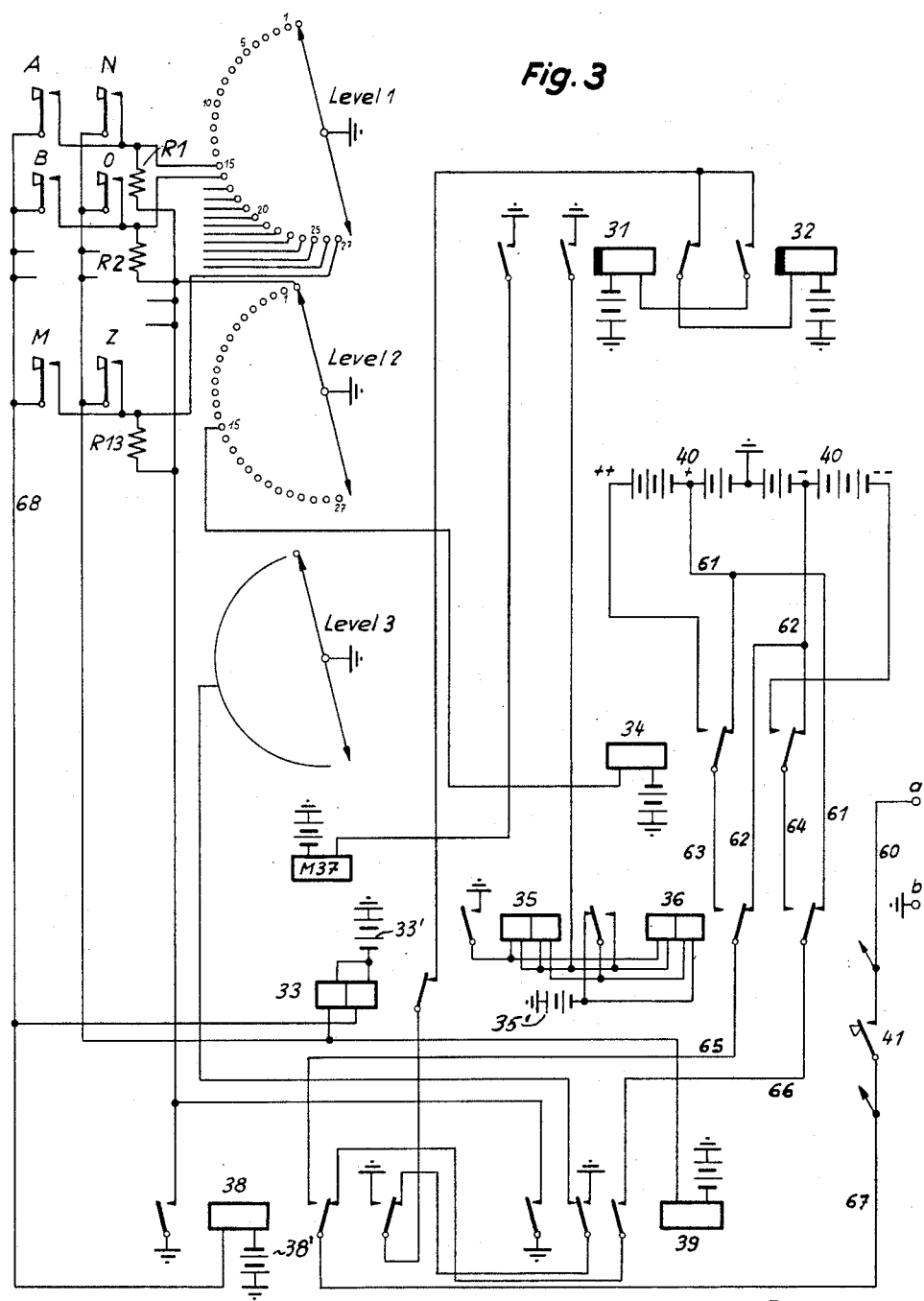
FIGURE 3 is a wiring diagram of a typical control device which may be employed to operate the symbol indicator of the present invention.

FIGURE 3 shows the diagram of a simple control arrangement which can be used in order to set the symbol indicator of the present invention. This control device has two rows of keys A to M and N to Z, by means of which a given letter can be set in indicating position on one or more symbol indicators such as shown in FIGURE 1. By means of the key 41, which is associated with the symbol indicator to be set or with a group of symbol indicators to be set simultaneously and into the same position, this control device can be used provisionally to set the symbol indicator associated with said key. By the provision of a plurality of keys 41, several symbol indicators or groups thereof can thus be set in different manners, one after the other by the same control device. The device has a step-by-step multiple-wafer switch of known construction, with three segments (levels) and 28 positions.

In order to facilitate explanation of the control processes (which do not in themselves form the subject matter of the present invention), there was selected a very simple typical circuit which does not offer much convenience of operation. However, it is self-evident that it is within the knowledge of a person skilled in the art to construct more complicated devices affording more convenience.

In order to set the symbol indicator of FIGURE 1, the corresponding key 41 must be depressed and held depressed during the setting process. In addition to the key 41, the letter key corresponding to the letter to be indicated must be also depressed and also held depressed during the setting process. Via key 41 and line 60, the symbol indicator of FIGURE 1 is now connected with the control device of FIGURE 3. As a starting position, it is assumed that only one of the symbol-bearing discs in the symbol indicator is in the position shown in the drawing, while the other is in a random position. First of all there is brought about the condition which is shown in FIGURE 1 in which both discs are in the synchronization position.

Let us assume, for instance, that the key B is depressed. A circuit is then formed from the battery 38' via relay 38, key B, resistor R2, rest position of the selector, level 2, and ground. In parallel to the circuit branch containing low-ohmic relay 38 there is also connected the circuit branch containing the right-hand winding of the high-ohmic relay 33. Conditions are so selected in this connection that only relay 38 becomes energized through the resistor R2. With its left working contact relay 38 shunts the circuit extending through the selector so that it remains energized independently of the position of the selector as long as the key B is depressed. With its right working contact, the relay 38, via the closed contact of relay 33, applies ground to the pulsing device consisting of the two relays 31 and 32. This pulsing device operates in a known manner so that first of all the relay 32 is energized, which relay energizes the relay 31. Relay 31 then disconnects the relay 32, which drops out and also allows relay 31 to drop out, whereupon the cycle starts all over again. Relay 31 by its two left-hand contacts transmits the pulses produced, namely, by means of the second left-hand contact, to the advancing magnet M37 of the selector, and by means of the first left-hand contact to the pulse-halving device consisting of the relays 35 and 36. In this pulse-halving device, relay 35 is first energized via the battery 35', left-hand rest contact of relay 36, the right-hand winding of relay 35 and the contact of relay 31. Relay 35 closes its contact, which for the time being does not produce any effect. When relay 31 drops out, then, as a result of the closed contact of relay 35, relay 36 also is energized, a circuit being formed from said contact through the parallel left-hand windings of relays 35 and 36, and through the right-hand winding of relay 35 and the left-hand rest contact of relay 36 to the battery 35'. When relay 36 is energized, it reverses its left-hand contact and thereby short-circuits the right-hand winding of relay 35 and opens the short-circuit across the right-hand winding of relay 36. Both relays have then been energized and the current flows from the contact of relay 35 in parallel through the two left-hand windings of the two relays and the right-hand winding of relay 36. If relay 31 now again closes its contact, the parallel left-hand windings of relays 35 and 36 are short-circuited, whereupon the relay 35 drops out. Relay 36 is then still held via the battery 35', right-hand winding of relay 36, the closed working contact of relay 36, and the contact of relay 31. Upon renewed (second) opening of the contact of relay 31, relay 36 also drops out so that the rest condition again prevails and the cycle can start all over again. The pulses of relay 31 thus alternately effect the energization and dropping out of the relays 35 and 36, i.e., the relays 35 and 36 operate with half the pulse velocity of relay 31.

Relay 36 now effects the application of pulses of different polarity to the symbol indicator. From battery 40, depending on the position of relay 36 and thus of its first right-hand changeover contact, a positive voltage passes via the lines 61 and 63, or negative voltage through the line 62, to the line 65, the first right-hand working contact of relay 38, the line 67, the key 41 and the line 60, to the symbol indicator. The symbol indicator is thus furnished pulses of alternating polarity which pass in parallel to both coils of the symbol indicator. Their voltage (the normal voltage) is only sufficient to advance that symbol-bearing disc which is not in the synchronization position shown in FIGURE 1. As soon as the disc in question has reached the synchronization position, it is restrained from moving further by the associated lever 12. Simultaneously with each alternation of polarity transmitted to the symbol indicator, the selector is moved forward one step via the left-hand contact of the relay 31. This selector counts off the alternations of polarity which are conducted to the symbol indicator and serve for resetting, and limits them to 14. This number of alternations of polarity makes it possible to establish the synchronization position of any disc, no matter in what position it originally was.

When the selector has arrived at the 15th step, the relay 34 is energized via the wiper arm of the second segment, and the first contact of this relay disconnects the line 63 from the line 61 which conducts normal positive voltage, and connects line 63 to an increased positive voltage. If now the relay 36 is energized after the 15th dropping out of the relay 31, the first right-hand contact of relay 36 applies this increased positive voltage, rather than the normal positive voltage, via the lines 65, 67 and 60 to the symbol indicator. In accordance with the previous explanation, this pulse of increased voltage is sufficient to overcome, in the case of the symbol-bearing disc on the left, the resistance of the spring 13 acting via the lever 12, and to rotate the disc through one step. The step-by-step motor of the disc on the right also receives the increased voltage pulse, but since its armature magnet 11 is in a position 180° different from that of the magnet on the left, no torque is exerted on this armature by a positive pulse. After the first step of the disc on the left, the letter A comes into the ray path of the lens system, while the opening 4 of the rear disc is present as previously in this ray path. Since the pin 15 of the disc on the left is no longer in engagement with its associated lever 12, this disc can again be advanced by normal pulses.

The next time that the relay 31 is energized, the selector is moved to the 16th step, and upon the following dropping out of relay 31, relay 36 also drops out again so that the normal negative voltage (line 62) is applied to the symbol-indicator. The symbol-bearing disc on the left can now be moved one step further so that the letter B is in the ray path while the disc on the right again remains stationary, since the negative pulse of normal voltage is not sufficient to advance it. By the advancing of the selector to the 16th step, the voltage on the high-ohmic relay 33 is increased, since the line 68 is connected directly to ground and the resistor R2 is thus short-circuited. A current then flows from battery 33', the right-hand winding of relay 33, closed key B, step 16 and the arm of level 1 of the selector to ground. Since in this way the full battery voltage is applied to the relay 33, the latter can become energized, while the relay 38 remains held. Relay 33, by means of its rest contact, interrupts the circuit through which the two relays 31 and 32 are actuated, as a result of which they cease operating. The selector and the symbol-bearing disc on the left are accordingly stopped. This symbol-bearing disc is then in such a position that the letter B is in the projection ray path, which corresponds to the key depressed. Since at all times two keys are always connected to a different position of the selector, the moment when the relay 33 is energized is dependent on the key depressed. The projection lamp is connected in the circuit in a manner not shown.

When the key B is now released, the relays 33 and 38 drop out. The line 60 to the symbol-indicator is interrupted by relay 38 and furthermore by the release of the key 41, so that the symbol-bearing discs remain stationary, regardless of what subsequently takes place. As a result of the dropping out of relays 33 and 38, a circuit is now closed via ground, the arm of the 3rd selector level, the second contact of relay 39, the second contact of relay 38, the contact of relay 33 and the pulse circuit containing the relays 31 and 32. The relays 31 and 32 therefore again start to operate and advance the selector. The relays 35 and 36 also operate, which, however, is without effect. The relays 31 and 32 continue in operation until the selector is in the position shown in the drawing, whereupon the circuit described is interrupted and the resetting is complete. Everything therefore is in the same position as was assumed at the beginning of this description.

If instead of key B, a key of the second row, for instance, Z, were depressed, then the relay 39 would have responded at the beginning through the resistor R13 instead of the relay 38. Instead of line 65, line 66 would then have been connected with line 67. The difference between lines 65 and 66 is merely that the pulses on line 66 have the opposite polarity to those on line 65; in other words, in the rest position of relay 36, the line 66 is connected to positive polarity and the line 65 to negative polarity. The important thing is now, however, the synchronization pulse which is applied upon the energization of relay 34. As soon as relays 34 and 36 are energized, the line 65, as previously described, is connected to a high positive voltage, while under the same conditions, the line 66 is connected to a high negative voltage. This is now decisive as to which of the two symbol-bearing discs is moved out of the synchronization position. If a key of the left-hand row which includes the letters contained on the left disc is depressed, relay 38 responds; the synchronization pulse is positive and the left-hand symbol-bearing disc is moved out of the rest position. If on the other hand a key of the right-hand row which includes the letters contained on the right-hand symbol-bearing disc is depressed, the relay 39 responds; the synchronization voltage is negative and the right-hand symbol-bearing disc is moved out of the rest position.

Due to the construction of the symbol indicator, it is possible to control both symbol-bearing discs via a single wire 60. This may be of great advantage in the case of long lines or in particular when one control device must be associated by switching means with a plurality of symbol indicators or groups of symbol indicators.

Figure 2:
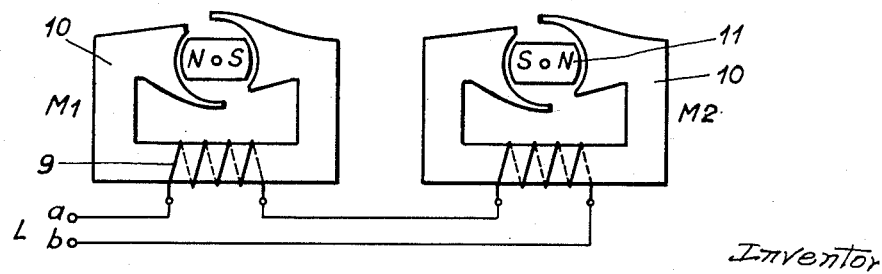
FIGURE 2 is a wiring diagram showing a modification of the device of FIGURE 1.

In a practical embodiment of a symbol-indicator such as described herein, a much more compact construction can, of course, be obtained than has been here shown for the sake of convenience in comprehension in FIGURE 1. In particular, it is advantageous to arrange the two symbol-bearing discs concentrically, whereby the total space required can be substantially reduced. It is also not necessary to use two-pole armatures for the step-by-step motors, since armatures of a different number of poles can also readily be used. The two step-by-step motors of a symbol indicator, instead of being connected in parallel as shown in FIGURE 1, can also be connected in series, as shown by way of example in FIGURE 2.

While certain specific embodiments of optical symbol indicator devices have been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. An optical symbol indicator comprising a pair of superimposed rotary discs bearing the symbols to be indicated and each having a clear aperture therein, each of said discs having a synchronization position, means for projecting images of symbols from one of said discs when the other disc is in its synchronization position wherein the aperture of one disc is in alignment with the projection means, respective D.C. pulse-operated step-by-step motors connected to the discs, said motors each being of a type driven through successive steps responsive to D.C. pulses applied thereto, one motor being positioned to be driven by a pulse of one polarity and the other motor being positioned to be driven by a pulse of the opposite polarity when the discs are in said synchronization positions, yieldable stop means engageable by the discs when said discs are in said synchronization positions, a single pair of common line conductors connected to both of said motors, means to normally supply D.C. pulses to said common line conductors of sufficient strength to drive said discs through said successive steps but insufficient to overcome said yieldable stop means, and means to supply a pulse through said line conductors to the step-by-step motors when their associated discs are in their synchronization positions of sufficient strength and proper polarity to overcome the yieldable stop means of only one of said associated discs, whereby to advance this one disc beyond its synchronization position.

2. An optical symbol indicator comprising a pair of superimposed rotary discs bearing the symbols to be indicated and each having a clear aperture therein, each of said discs having a synchronization position, means for projecting images of symbols from one of said discs when the other disc is in its synchronization position wherein the aperture of one disc is in alignment with the projection means, respective D.C. pulse-operated step-by-step motors connected to the discs, said motors each being of a type driven through successive steps responsive to D.C. pulses of alternating polarity applied thereto, one motor being positioned to be driven by a pulse of one polarity and the other motor being positioned to be driven by a pulse of the opposite polarity when the discs are in said synchronization positions, a single pair of common line conductors, means connecting said motors in parallel to said common line conductors, means to normally supply pulses of alternating polarity to said line conductors of sufficient strength to drive said discs through said successive steps but insufficient to overcome said yieldable stop means, and means to supply a pulse through said line conductors to the step-by-step motors when their associated discs are in their synchronization positions, of sufficient strength and proper polarity to overcome the yieldable stop means of only one of said associated discs, whereby to advance this one disc beyond its synchronization position.

3. An optical symbol indicator comprising a pair of superimposed rotary discs bearing the symbols to be indicated and each having a clear aperture therein, each of said discs having a synchronization position, means for projecting images of symbols from one of said discs when the other disc is in its synchronization position wherein the aperture of one disc is in alignment with the projection means, respective D.C. pulse-operated step-by-step motors connected to the discs, said motors each being of a type driven through successive steps responsive to D.C. pulses of alternating polarity applied thereto, one motor being positioned to be driven by a pulse of one polarity and the other motor being positioned to be driven by a pulse of the opposite polarity when the discs are in said synchronization positions, a single pair of common line conductors, means connecting said motors in series to said common line conductors, means to normally supply pulses of alternating polarity to said line conductors of sufficient strength to drive said discs through said successive steps but insufficient to overcome said yieldable stop means, and means to supply a pulse through said line conductors to the step-by-step motors when their associated discs are in their synchronization positions of sufficient strength and proper polarity to overcome the yieldable stop means of only one of said associated discs, whereby to advance this one disc beyond its synchronization position.

4. An optical symbol display comprising: projector means, having an optical axis, for projecting images of symbols; a pair of superimposed rotary discs bearing the symbols to be projected arranged concentrically thereon and including respective projection apertures located on the same circle as the symbols, each of said discs being in a synchronization position when the projection apertures are situated on the optical axis, said means projecting a symbol on one of the discs when it registers with the aperture of the other disc, with said other disc in its synchronization position, respective D.C. pulse-operated step-by-step motors connected to the discs, said motors each being of a type driven through successive steps, corresponding to the spacings between the symbols on the discs, responsive to successive pulses of alternating polarity applied to the motor, one motor being positioned to be driven by a pulse of one polarity and the other motor being positioned to be driven by a pulse of the opposite polarity when their associated discs are in said synchronization positions, yieldable stop means engageable by the discs when said discs are in said synchronization positions, a single pair of common line conductors connected to said motors, means to normally supply pulses of alternating polarity to said common line conductors of sufficient strength to drive said discs through said successive steps but insufficient to overcome said yieldable stop means, and means to supply a pulse through said line conductors to the step-by-step motors when their associated discs are in their synchronization positions of proper polarity and sufficient strength to overcome the yieldable stop means of one of said associated discs, whereby to advance this one disc beyond its synchronization position.

5. An optical symbol display comprising: projector means, having an optical axis, for projecting images of symbols; a pair of superimposed rotary discs bearing the symbols to be projected arranged concentrically thereon and including respective projection apertures located on the same circle as the symbols, each of said discs being in a synchronization position when the projection apertures are situated on the optical axis, said means projecting a symbol on one of the discs when it registers with the aperture of the other disc, with said other disc in its synchronization position, respective D.C. pulse-operated step-by-step motors connected to the discs, said motors each being of a type driven through successive steps, corresponding to the spacings between the symbols on the discs, responsive to successive pulses of alternating polarity applied to the motor, said motors having respective armature magnets, the armature magnet of one motor being positioned to be started by a pulse of one polarity and the armature magnet of the other motor being positioned to be started by a pulse of the opposite polarity when their associated discs are in said synchronization positions, yieldable stop means engageable by the discs when said discs are in said synchronization positions, a single pair of common line conductors connected to said motors, means to normally supply pulses of alternating polarity to said common line conductors of sufficient strength to drive said discs through said successive steps but insufficient to overcome said yieldable stop means, and means to supply a pulse through said line conductors to the step-by-step motors when their associated discs are in their synchronization positions of proper polarity and sufficient strength to overcome the yieldable stop means of one of said associated discs, whereby to advance this one disc beyond its synchronization position.

6. The structure of claim 5, and wherein the motors are connected in parallel to said common line conductors.

7. The structure of claim 5, and wherein the motors are connected in series to said common line conductors.

8. An optical symbol indicator comprising a pair of superimposed rotary discs bearing the symbols to be indicated and each having a clear aperture therein, each of said discs having a predetermined synchronization position, means for projecting images of symbols from one of said discs when the other disc is in its synchronization position wherein the aperture of one disc is in alignment with the projection means, respective D.C. pulse-operated step-by-step motors connected to the discs, said motors each being of a type driven through successive steps responsive to D.C. pulses of alternating polarity applied thereto, one motor being normally started by a D.C. pulse of positive polarity and the other motor being normally started by a D.C. pulse of negative polarity, yieldable stop means engageable by the discs when said discs are in said synchronization positions, a single pair of supply conductors connected to both of said motors, a source of D.C. pulses of alternating polarity connected to said conductors, said pulses being normally of sufficient strength to drive said discs through successive steps but insufficient to overcome said yieldable stop means, and means to supply a pulse through said supply conductors to the motors of sufficient strength and proper polarity to overcome the yieldable stop means of only one of the associated discs, whereby to advance this one disc beyond its synchronization position.

References Cited in the file of this patent

UNITED STATES PATENTS

| | | |
|---|---|---|
| 1,698,013 | Zeng | Jan. 8, 1929 |
| 1,895,942 | Rowell | Jan. 31, 1933 |
| 2,369,483 | Musebeck | Feb. 13, 1945 |